US011403663B2

(12) United States Patent
Pustejovsky et al.

(10) Patent No.: US 11,403,663 B2
(45) Date of Patent: Aug. 2, 2022

(54) AD PREFERENCE EMBEDDING MODEL AND LOOKALIKE GENERATION ENGINE

(71) Applicant: Spotify AB, Stockholm (SE)

(72) Inventors: Zachary A. Pustejovsky, Brooklyn, NY (US); Zachary W. Nichols, Long Island City, NY (US); Jeremiah M. Cohen, New York, NY (US); David S. Susi, Brooklyn, NY (US)

(73) Assignee: Spotify AB, Stockholm (SE)

( * ) Notice: Subject to any disclaimer, the term of this patent is extended or adjusted under 35 U.S.C. 154(b) by 88 days.

(21) Appl. No.: 16/414,393

(22) Filed: May 16, 2019

(65) Prior Publication Data
US 2019/0355011 A1  Nov. 21, 2019

Related U.S. Application Data

(60) Provisional application No. 62/672,877, filed on May 17, 2018.

(51) Int. Cl.
*G06Q 30/02* (2012.01)
*G06N 20/00* (2019.01)

(52) U.S. Cl.
CPC ......... *G06Q 30/0244* (2013.01); *G06N 20/00* (2019.01)

(58) Field of Classification Search
CPC .. G06Q 30/244; G06Q 30/02; G06Q 30/0244; G06Q 30/0207–30/0277; G06N 20/00; G06N 3/08; G06F 16/358
See application file for complete search history.

(56) References Cited

U.S. PATENT DOCUMENTS

| | | | | |
|---|---|---|---|---|
| 8,046,797 B2 * | 10/2011 | Bentolila | ........... | H04N 21/4663 725/46 |
| 8,521,679 B2 * | 8/2013 | Churchill | ............... | G06Q 10/00 706/52 |
| 8,750,843 B2 | 6/2014 | Forrester et al. | | |

(Continued)

FOREIGN PATENT DOCUMENTS

| | | |
|---|---|---|
| CN | 104506964 A1 | 4/2015 |
| EP | 2410444 A2 | 1/2012 |

OTHER PUBLICATIONS

Hector Garcia-Molina et al. "Sagas", Princeton University, Princeton, NJ, US, 16/3, pp. 249-259 (Dec. 1987).

(Continued)

*Primary Examiner* — Thuy N Nguyen
(74) *Attorney, Agent, or Firm* — Merchant & Gould P.C.

(57) ABSTRACT

Methods, systems and computer program products for automating the association of messages. Data points associated with at least one client device associated with an identifier are logged into an activity database. Labels corresponding to message records are retrieved. Message-signal values representing behavior associated with at least a subset of the message records are also retrieved. The labels are merged with the message-signal values to generate a signal-label collection. A signal-label model is trained based on the signal-label collection, thereby generating a trained signal-label model. A mapping of the one or more activity data points and the plurality of labels are then generated. The embedding that is generated can then be used to find custom audiences.

14 Claims, 8 Drawing Sheets

(56) References Cited

U.S. PATENT DOCUMENTS

| | | | |
|---|---|---|---|
| 9,002,100 B2* | 4/2015 | Lecerf | G06K 9/6254 |
| | | | 382/159 |
| 9,026,577 B1 | 5/2015 | Johnston | |
| 9,087,332 B2* | 7/2015 | Bagherjeiran | G06Q 30/0269 |
| 9,245,280 B2 | 1/2016 | Zheng et al. | |
| 9,355,627 B2 | 5/2016 | Ales | |
| 9,397,969 B2 | 7/2016 | Torrenegra et al. | |
| 9,646,249 B2* | 5/2017 | Corrada-Emmanuel | |
| | | | G06N 20/00 |
| 9,711,179 B2 | 7/2017 | Axen et al. | |
| 9,721,321 B1 | 8/2017 | Nayeri | |
| 9,721,551 B2 | 8/2017 | Silverstein | |
| 9,959,557 B2 | 5/2018 | Bharath et al. | |
| 10,037,121 B2* | 7/2018 | Shen | G06F 3/0481 |
| 10,147,041 B2* | 12/2018 | Gao | G06Q 30/0241 |
| 10,392,022 B1* | 8/2019 | Rau | B60W 40/12 |
| 10,528,977 B1 | 1/2020 | Jogia et al. | |
| 10,553,316 B1* | 2/2020 | Neumann | G16H 20/60 |
| 10,657,556 B1* | 5/2020 | Lu | G06N 20/00 |
| 2006/0075430 A1 | 4/2006 | Park | |
| 2006/0075443 A1 | 4/2006 | Eckert | |
| 2007/0120975 A1 | 5/2007 | Tsai et al. | |
| 2008/0249855 A1 | 10/2008 | Collins et al. | |
| 2009/0150445 A1 | 6/2009 | Herberger et al. | |
| 2011/0191170 A1* | 8/2011 | Zhang | G06Q 30/0247 |
| | | | 705/14.46 |
| 2011/0196751 A1 | 8/2011 | Steelberg | |
| 2011/0225565 A1 | 9/2011 | van Velzen et al. | |
| 2011/0231257 A1* | 9/2011 | Winters | G06Q 30/0255 |
| | | | 705/14.53 |
| 2011/0243344 A1 | 10/2011 | Bakalos et al. | |
| 2012/0158452 A1 | 6/2012 | Shafiee | |
| 2012/0269436 A1* | 10/2012 | Mensink | G06K 9/00624 |
| | | | 382/180 |
| 2013/0124298 A1* | 5/2013 | Li | G06Q 30/0241 |
| | | | 705/14.42 |
| 2014/0029839 A1* | 1/2014 | Mensink | G06K 9/6272 |
| | | | 382/159 |
| 2014/0046777 A1* | 2/2014 | Markey | G06Q 30/0275 |
| | | | 705/14.66 |
| 2014/0279032 A1 | 9/2014 | Roever et al. | |
| 2015/0106825 A1 | 4/2015 | Abbas | |
| 2015/0220853 A1* | 8/2015 | Marcheret | G06N 7/00 |
| | | | 706/12 |
| 2015/0332341 A1 | 11/2015 | Gadoury et al. | |
| 2015/0356136 A1* | 12/2015 | Joshi | G06F 16/245 |
| | | | 707/736 |
| 2015/0379224 A1 | 12/2015 | Rosen | |
| 2016/0180247 A1* | 6/2016 | Li | G06N 20/00 |
| | | | 706/12 |
| 2016/0315722 A1 | 10/2016 | Holman | |
| 2016/0371122 A1 | 12/2016 | Nair | |
| 2016/0379274 A1 | 12/2016 | Irwin et al. | |
| 2017/0017886 A1* | 1/2017 | Gao | G06N 20/00 |
| 2017/0052954 A1* | 2/2017 | State | G06F 16/48 |
| 2017/0099592 A1 | 4/2017 | Loeb et al. | |
| 2017/0132528 A1* | 5/2017 | Aslan | G06N 20/00 |
| 2017/0161590 A1* | 6/2017 | Boulkenafed | G06V 10/82 |
| 2017/0177135 A1 | 6/2017 | Sarin | |
| 2017/0364771 A1* | 12/2017 | Pinheiro | G06V 10/454 |
| 2018/0012236 A1* | 1/2018 | Zhuo | G06N 20/00 |
| 2018/0158093 A1* | 6/2018 | Szirtes | G06N 5/022 |
| 2018/0218407 A1* | 8/2018 | He | G06Q 30/0277 |
| 2018/0225721 A1 | 8/2018 | Bharath et al. | |
| 2018/0232528 A1* | 8/2018 | Williamson | G06N 20/00 |
| 2018/0260857 A1* | 9/2018 | Kar | G06Q 30/0255 |
| 2018/0308133 A1* | 10/2018 | Geist, Jr. | G06Q 30/0271 |
| 2018/0336457 A1* | 11/2018 | Pal | G06N 3/0454 |
| 2018/0337798 A1* | 11/2018 | Ilic | H04L 51/063 |
| 2018/0341990 A1 | 11/2018 | Bardin et al. | |
| 2019/0007508 A1* | 1/2019 | Xu | G06Q 30/0255 |
| 2019/0130226 A1 | 5/2019 | Guo | |
| 2019/0156210 A1* | 5/2019 | He | G06N 3/0481 |
| 2019/0188561 A1* | 6/2019 | Tang | G06F 16/9535 |
| 2019/0228766 A1 | 7/2019 | White et al. | |
| 2019/0243547 A1 | 8/2019 | Duggal | |
| 2019/0244257 A1 | 8/2019 | Goldman et al. | |
| 2019/0250891 A1* | 8/2019 | Kumar | G06K 9/6218 |
| 2019/0354396 A1 | 11/2019 | Wallace | |
| 2019/0355024 A1 | 11/2019 | Han | |
| 2019/0355372 A1 | 11/2019 | Bittner | |
| 2020/0126111 A1* | 4/2020 | Szirtes | G06Q 30/0242 |
| 2020/0193603 A1* | 6/2020 | Golden | G06T 7/136 |
| 2022/0114620 A1 | 4/2022 | Han | |

OTHER PUBLICATIONS

Judith C. Brown "Calculation of a constant Q spectral transform", Accoustical Society of America, US, 89/1, pp. 425-434 (Jan. 1991).

S. Ali and P. Aarabi, "A Cyclic Interface for the Presentation of Multiple Music Files," in IEEE Transactions on Multimedia, vol. 10, No. 5, pp. 780-793, Aug. 2008, doi: 10.1109/TMM.2008/922848. (Year: 2008).

M.M. Rahman Siddiquee, M.S. Rahman, N. Haider, R.M. Rahman, S.U.I. Chowdhury and S. Banik, "A personalized music discovery service based on data mining," 2015 IEEE/ACIS 14th Int'l Conf. on Comput. and Info. Science (ICIS), Las Vegas, NV, 2015, pp. 253-258, doi: 10.1109/ICIS. (2015).

A Chen and M.A. Hasegawa-Johnson, "Mixed Stereo Audio Classification Using a Stereo-Input Mixed-to-Panned Level Feature," in IEEE/ACM Transactions on Audio, Speech, and Language Processing, vol. 22, No. 12, pp. 2025-2033, Dec. 2014, doi: 10.1109/TASLP.2014.2359628. (2014).

Herzi, Saida, "System for Enabling Audio Delivery of Internet Content", An IP.com Prior Art Database Technical Disclosure, IP.com Electronic Publication Date: Jan. 29, 2003 (Year: 2003).

Oracle, JD Edwards EnterpriseOne Tools Workflow Tools Guide, Release 8.98, Update 4, Oracle, Mar. 2011, 166 pages.

* cited by examiner

| Row | orderId | labelName | companyName | orderName |
|---|---|---|---|---|
| 1 | 5633312652 | Autos - Car Makers | CAR CO.\| ACC-089982 | CAR CO. April - Sept 2017 |
| 2 | 5633310012 | Arts & Entertainment - Movies | MOVIE CO. \| ACC-478632 | CUC-00024421 - EC – MOVIE CO. Movie_Name Mar 17 |
| 3 | 5633304732 | Retail - Apparel | RETAIL CO. \| ACC-445736 | RETAIL CO. CA_Q1 17 |
| 4 | 5633303052 | Consumer Packaged Goods - Beverages | ACME BEVERAGES \| ACC-478622 | CUC-00024634 - PE – ACME BEV. -Product Name- Feb Mar 17 |
| 5 | 5632299212 | Retail - Apparel | ACME APPAREL \| ACC-033687 | ACME APPAREL March 2016 Audio |
| 6 | 5632295372 | Retail - Mass Merchandise | ACME MERCHANDISE \| ACC-093706 | ACME MERCHANDISE. - 1Q'17 - March - Radio |
| 7 | 5632291772 | Retail - Apparel | Rent CO. \| ACC-476306 | Rent Co. Q1 2017 |

User-level Musical Taste Expressed as the First Two Principal Components of Our Word2vec Latent Factor Embedding

|  | Labels |
|---|---|
| 146a7c68a4634fd8a92cd92dd4acf18d | Business to Business (b2b) |
| c82ce1c6902a48baa5fedede7d21baa5 | Retail |
| a1451fd0f18648f6ad1387af5f1efdfb | Arts & Entertainment |
| 8a8ee7cbe77e4d5a9c1a75eb661e1956 | Arts & Entertainment |
| 3d77de02cb1c42c5abe08145a78aa65b | Travel & Recreation |

AD PREFERENCE EMBEDDING MODEL AND LOOKALIKE GENERATION ENGINE

CROSS REFERENCE TO RELATED APPLICATIONS

This application claims priority to, and the benefit of, U.S. Provisional Patent Application Ser. No. 62/672,877, filed May 17, 2018, which is hereby incorporated by reference in its entirety.

TECHNICAL FIELD

Example aspects described herein relate generally to creative generation and creative trafficking systems, and in particular to a system, a method, an apparatus and a non-transitory computer-readable storage medium for asynchronously executing creative generator and trafficking workflows and components therefor.

DESCRIPTION OF RELATED ART

Existing solutions for generating and trafficking creatives involve processes that are variable and require different levels of effort and cost, as well as significant interaction through the use of several tools. Creative content providers would like to hedge their goals across different and new creative types and campaigns, but existing technology limits their ability to do so. Backend, foundational infrastructure for performing such functionality is lacking. One challenge in developing such an infrastructure lies in the lack of technology capable of generating creative content based on a minimal number of input signals.

There is a need for technology that provides the connections and interplay between the functional components through which data and content associated with different types of creatives can flow and be processed efficiently. Performing existing processes using conventional functional components and pipelines becomes a significant engineering challenge in view of failure modes, recovery options, retries, notifications and the like. In addition, significant engineering challenges have prohibited the extent to which the workflows in the pipeline can be automated.

One component of a creative generation system involves determining the type of creative to generate. Typically digital creatives (also referred to as "assets") can be static and include an image or a graphic that does not move (e.g., a GIF or JPEG), an image, a graphic or a video media object that is animated (e.g., MPEG video), an audio files or a rich media creative which users can interact with. Existing interfaces have many deficits relating to the efficient functioning of creative generation systems, requiring users to enter a significant number of input signals, sometimes across various components and applications. Consequently, this existing technology is an inefficient functioning of one or more computers which leads to slow, complex and difficult to learn and use creative generation, particularly to novice users. Lacking is technology that can retrieve and operate on information and content from various external sources or provide the most appropriate and targeted creative possible based on a relatively low number of input signals.

Media content providers (e.g., streaming audio providers) not only maintain large corpuses of media content, but also collect metadata about the content artists (e.g., images for the artist, artist content, and the like) and about consumers of the content (e.g., demographics about activities surrounding the content or consumer preferences). Other entities can provide or maintain other types of related or indirectly related information. For example a promoter may store in its database concert dates. Technical challenges have prohibited these types of providers and others from automating the process of generating and trafficking creatives. Consequently, the time by which a creative must be produced and distributed may be difficult to meet without expending extraordinary efforts.

It would be useful, therefore, to have a system that automates and improves the speed of creative generation process and traffics the creatives to devices more intelligently.

Many types of audio content, such as advertisements, radio shows, podcasts, or movie soundtracks require a recording of a voice to be mixed with background music or a soundscape. The mix needs to be balanced, so that the background is audible but does not overpower the voice. Existing voiceover mixing solutions, require trained audio engineers to manually create mixes and masters. However, this manual process is time consuming, subjective and costly, making it near impossible to scale. Accordingly, there is need for a voiceover mixing technological solution that automates the processes performed by the mixing engineering that allows for the scalable creation of audio creatives.

Building a unified model of user ad preferences is difficult due to the sparsity of data; very few people interact with online advertisements in the volumes necessary to get a complete picture of the types of ads they desire.

Existing solutions build a model that embeds entities in some space where "closeness" indicates similarity of some kind. In the case of modeling online user events these models usually take a large series of events, such as "user 1 performs event A" (in which "event A" could be purchasing a product, streaming a song, etc.) and learn a single unifying space in which users and events can be embedded. These models are typically used in recommendation systems by finding the events that are closest to a given query point, which point represents a user.

One solution for expanding the size of advertising campaigns on a particular platform, the LinkedIn platform, is described in Liu, H., et al., "Audience Expansion for Online Social Network Advertising", KDD '16, Proceedings of the $22^{nd}$ ACM SIGKDD Int'l Conf. on Knowledge Discovery and Data Mining, pages 165-174, ACM, New York, N.Y. (Aug. 13-17, 2016). The methods make extensive use of a language model built from proprietary user data (e.g. company names, skills, etc.). Though this system is highly advanced, it has several shortcomings in the domain of online advertising. One reason is that, in the system described by Liu, H. et al., the representation of a user's profile is a vector-space generated from language features. However, the subsequent use of such a system is not more computationally tractable. In addition to these shortcomings in language representation, the language model employed by the system described in Liu, H. et al. requires user-generated text data from every user that is modeled. As such, they will suffer from what is known as a "cold-start" problem, where new users or users that have never performed certain actions cannot be easily modeled. This cold-start issue is especially problematic for modeling online advertising, a domain in which only a small proportion of users tend to interact with the entities to be modeled (e.g. the advertisements). The "sparsity" of the source dataset makes it significantly hard to model effectively for every user. There is a need, therefore, for a technical solution that improves systems for ad personalization, campaign optimization, and audience generation.

The LinkedIn paper referenced above uses a Locality-Sensitive Hashing technique on a language model of user profiles. The system proposed by LinkedIn, however, does not use ad preferences as the source data, and therefore requires a second model that predicts ad preferences of users.

It has been realized that there is a need to be able to find users with similar preferences. Lacking, however, is a general system for finding groups of users with similar ad preferences to a query set of users. One technical problem involves finding similar users in the simplest possible way, without resorting to separate models for similarity and preference (as LinkedIn does). There is a need, therefore for a system that can be used in a number of settings, including, but not limited to:

Campaign Extension
Audience Extension
Opportunity Sizing
Exploratory Analysis

BRIEF DESCRIPTION

In an example embodiment, a computer-implemented method for automating the association of messages is provided. The method includes logging into an activity database one or more activity data points associated with at least one client device associated with an identifier; retrieving, from a label database, a plurality of labels corresponding to a plurality of message records stored in a message database; retrieving, from a message-signal database, a plurality of message-signal values representing behavior associated with at least a subset of the plurality of message records; merging the plurality of labels with the plurality of message-signal values to generate a signal-label collection; training a signal-label model based on the signal-label collection, thereby generating a trained signal-label model; and generating, using the trained signal-label model, a mapping of the one or more activity data points and the plurality of labels.

In some embodiments, the method further includes generating a collection of label-group identifiers, each label group identifier corresponding to one or more of the plurality of labels; and generating a ranking map that maps a ranking to each label-group identifier.

In some embodiments the one or more activity data points include a plurality of behavior data points corresponding to actions of a user associated with the identifier and a plurality of demographic data points associated with one or more demographic attributes associated with the user.

In some embodiments, each of the plurality of message-signals values representing an action associated with a plurality of sets of client devices, each set of client devices associated with a different identifier.

In some embodiments, the plurality of labels corresponding to a subset of the plurality of message records.

In some embodiments, the plurality of labels includes a plurality of non-null labels and a plurality of null labels and further comprising the steps of: training a label model based on a plurality of non-null labels, thereby generating a trained label model; and imputing, using the trained label model, the null labels.

In another embodiment, a system for find a plurality of similar users having a target behavior is provided. The system includes a database operable to store embeddings corresponding to a plurality seed users, the embeddings being on an embedding space; an interface configured to receive a query corresponding to one of the plurality of seed users; a locality-sensitive hashing model operable to generate a query point from the query; a merging processor operable to merge the query point with the embedding space for each of a plurality of seed users according to a predetermined distance between the embeddings and the query point; and a similar user database configured to store a plurality of n similar users.

In some embodiments, the predetermined distance between the embedding and the query point is adjusted by a control via the interface.

In another example embodiment, a system for querying an embedding of user ad preferences to find custom audiences is provided. The system includes a database configured to store a user ad preference embedding corresponding to a target user; a locality-sensitivity hashing (LSH) model operable to hash the user ad preference embedding thereby generating a query point; a merge component operable to merge the query point with an embedding space for each of a plurality of seed users stored in a seed user database; and a similar user database configured to store a plurality of n similar users.

In yet another example embodiment, there is provided a non-transitory computer-readable medium having stored thereon one or more sequences of instructions for causing one or more processors to perform: logging into an activity database one or more activity data points associated with at least one client device associated with an identifier; retrieving, from a label database, a plurality of labels corresponding to a plurality of message records stored in a message database; retrieving, from a message-signal database, a plurality of message-signal values representing behavior associated with at least a subset of the plurality of message records; merging the plurality of labels with the plurality of message-signal values to generate a signal-label collection; training a signal-label model based on the signal-label collection, thereby generating a trained signal-label model; and generating, using the trained signal-label model, a mapping of the one or more activity data points and the plurality of labels.

In some embodiments, the non-transitory computer-readable medium has stored thereon a sequence of instructions for causing the one or more processors to perform: generating a collection of label-group identifiers, each label group identifier corresponding to one or more of the plurality of labels; and generating a ranking map that maps a ranking to each label-group identifier.

In some embodiments, the one or more activity data points include a plurality of behavior data points corresponding to actions of a user associated with the identifier and a plurality of demographic data points associated with one or more demographic attributes associated with the user.

In some embodiments, each of the plurality of message-signals values representing an action associated with a plurality of sets of client devices, each set of client devices associated with a different identifier.

In some embodiments, the plurality of labels corresponding to a subset of the plurality of message records.

In some embodiments, the plurality of labels includes a plurality of non-null labels and a plurality of null labels and further comprising the steps of: training a label model based on a plurality of non-null labels, thereby generating a trained label model; and imputing, using the trained label model, the null labels.

BRIEF DESCRIPTION OF THE DRAWINGS

The features and advantages of the example embodiments of the invention presented herein will become more apparent from the detailed description set forth below when taken in conjunction with the following drawings.

FIG. 4 shows an example data set illustrating ad label inferences.

DESCRIPTION

Figure 1:
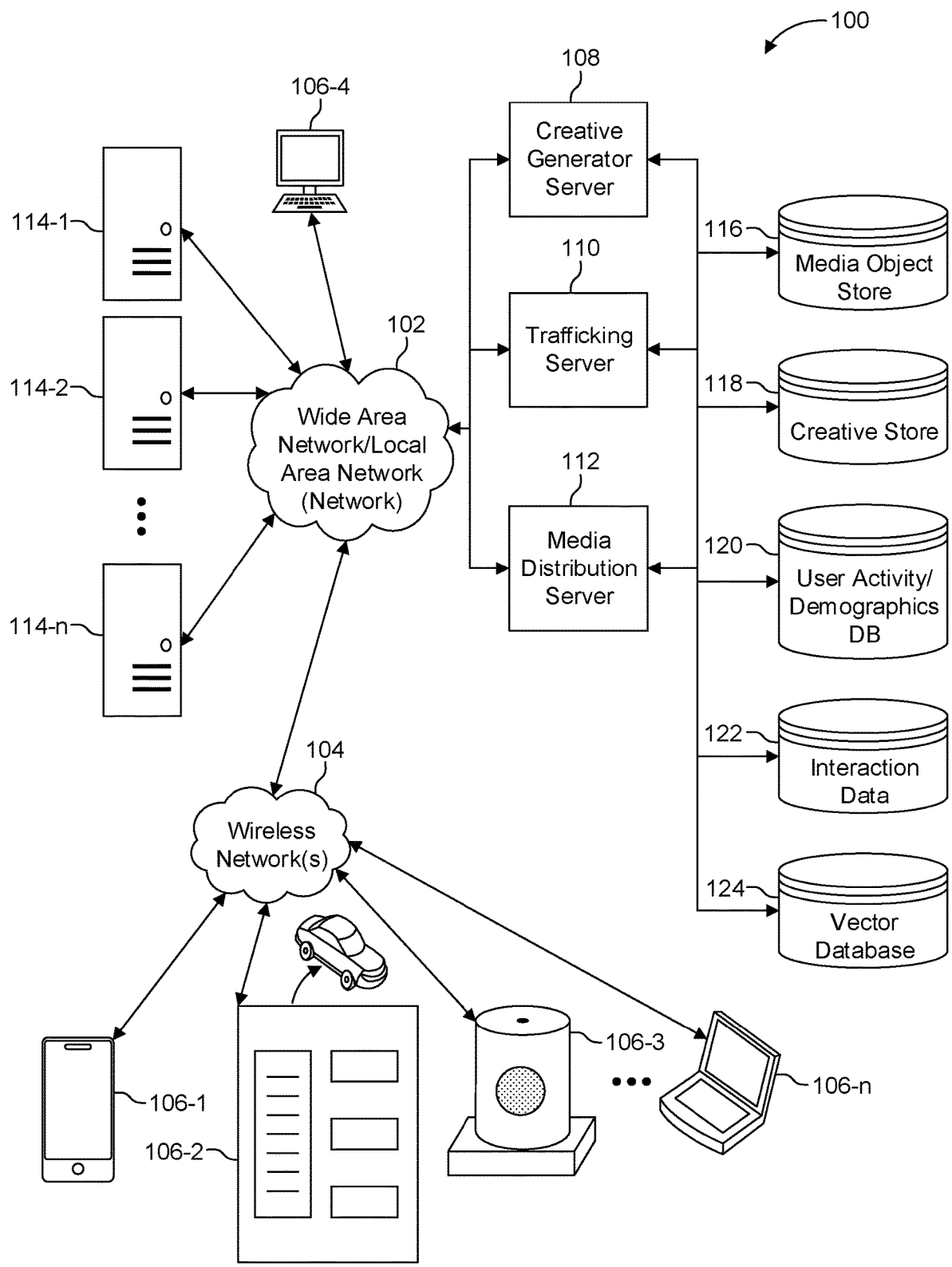
FIG. 1 illustrates an example system for generating and trafficking creatives.

FIG. 1 illustrates an example system for generating and trafficking creatives. Not all of the components are required to practice the invention, and variations in the arrangement and type of the components may be made without departing from the spirit or scope of the invention. As used herein, the term "component" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result. System 100 of FIG. 1 includes wide area networks/local area networks ("LANs/WANs")—(Network) 102, wireless network(s) 104, client devices 106-1, 106-2, 106-3, 106-4, . . . , 106-n (referred to collectively and individually as client device 106), a creative generator server 108, a trafficking server 110, a media distribution server 112 and one or more external systems 114-1, 114-2, . . . , 114-n (referred to collectively and individually as an external system 114).

Wireless network 104 is configured to communicatively couple client devices 106 and their components with network 102. Wireless network 104 may include any of a variety of wireless sub-networks that may further overlay stand-alone ad-hoc networks, and the like, to provide an infrastructure-oriented connection for client devices 106. Such sub-networks may include mesh networks, wireless LAN (WLAN) networks, cellular networks, and the like. Other now or future known types of access points may be used in place of network 102 and wireless network 104.

Generally, the creative generator server 108 and trafficking server 110 cooperatively operate to generate and traffic creatives. In some examples, a creative is in the form of a media content item. For simplicity as used herein, a creative media content time is sometimes simply referred to as a creative. Input specifying criteria for a creative is input via an input interface of an external system 114. In an example, embodiment, the input is provided to external system 114 via a client device 106 (e.g., client interface 106-4. In turn, the input is communicated to creative generator server 108 (via, e.g., WAN/LAN 102). Creative generator server 108 receives the input through from the network (e.g., WAN/LAN 102) and executes creative generation applications asynchronously. Trafficking server 110 executes trafficking workflows asynchronously for the purpose of communicating the creatives generated by creative generator server 108 to targeted media-playback devices. Each creative is, in turn, communicated through network 102 to a client device 106 that has been targeted to receive the creative. The client device 106, in turn, plays the creative.

System 100 also includes a media object store 116 that stores media objects, a creative store 118 that stores creatives that have been generated by creative generator server 108, a user activity/demographics database 120 that stores user activity and demographic data, an interaction database 122 that stores activity profiles associated with accounts (e.g., of users), and a vector database 124 that stores vectors in accordance with the embodiments described herein.

In one example embodiment there is provided an automated creative development platform that performs asynchronous execution of creative generation workflows and trafficking workflows via a message queue. The platform includes creative platform components that operate according to custom workflow definitions to manage such creative generation and trafficking workflows during execution. A workflow definition represents a process and describes the tasks involved in the process. Workflow definitions can include properties, events, methods, protocols, indexers, and the like. A workflow can be defined for one specialized component. In some embodiments a workflow can be defined for more than one specialized component. A specialized component can have multiple workflow definitions. The two workflows can reflect two different processes the specialized component can perform. In some embodiments, a specialized component can be involved in more than one workflow at a time. In some embodiments, the workflows can operate asynchronously.

The following non-limiting examples are described in terms of generating a creative that includes audio objects that have been previously stored in media object store 116. This description is not intended to limit the application of the example embodiments. In fact, after reading the following description, it will be apparent to one skilled in the relevant art(s) how to implement the following example embodiments in alternative embodiments. For example, by extending the platform to generate and traffic unique targeted creatives containing other types of media objects (e.g., video, text, etc.) in a variety of formats, and whether stored in media object store 116 or provided from a different source.

Figure 2:
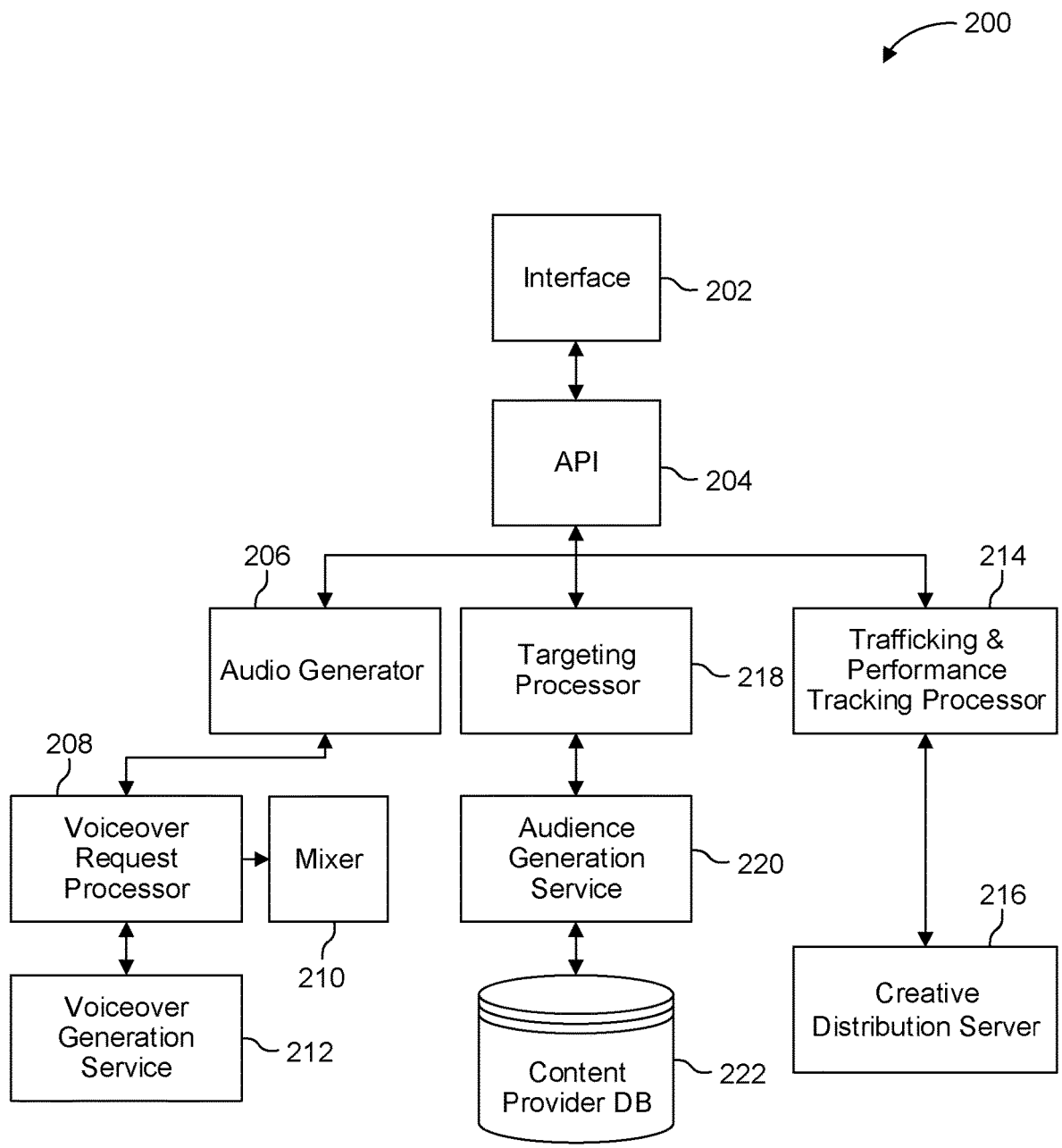
FIG. 2 illustrates a block diagram of an exemplary creative development platform including the applications executed by a creative generator server and a creative trafficking server.

FIG. 2 illustrates a block diagram of an exemplary creative development platform 200 including the creative platform components executed by the creative generator server 108 (FIG. 1) and creative trafficking server 110 (FIG. 1). In an example embodiment, creative platform components include an audio generator 206, a voice request processor 208, a mixer 210, and voiceover generation service 212. Creative platform components also can include a targeting processor 218, audience generation service 220, and a content provider database 222. Creative platform components also can include a trafficking and performance tracking processor 214 and a creative distribution server 216.

The features and advantages of the creative platform components presented herein will become more apparent from the detailed description set forth below when taken in conjunction with the respective drawings.

An interface 202 contains definitions used to mediate the exchange of information between the creative platform components of creative development platform 200 as well as external systems 114 (FIG. 1) that can provide external sources of data (i.e., data that is external to creative development platform 200).

In some embodiments, input interface 202 provides a control configured to receive input data to modify the definitions. In some embodiments, the control can take the form of a user interface (UI) designed into a device with which a person may interact. This can include display screens, keyboards, and/or a mouse or other input device that allow a user to interacts with the interface 202 to modify the workflow definitions or applicable data. The modification to the workflow definitions, in turn, generate modified workflow definitions that are used to generate one or more creatives having specified properties. In some embodiments, such modifications to the workflow definitions modify the traffick properties that define how the creative is trafficked. For example, input interface 202 can be configured to adjust input data through the use of an editor that receives input to vary the individual properties of the input data (e.g., data elements originally entered via input interface 202, such as tone, rhythm, etc.). In one non-limiting example, input interface 202 can receive description information that contains data elements (e.g., attributes) describing a particular deliverable (e.g., targeted creative). The input is saved as one or more creative input objects containing data elements defining a particular deliverable.

In some embodiments, the input data can be provided through input interface 202 includes, for example, background media content, a script for s voiceover, a tone of s voiceover, one or more targeting parameters, one or more timing parameters. Examples of such information includes a name of a song or track identifier (ID), voiceover script ID, emotional tone and rhythm, time(s) and date(s), images, and other metadata, correspondingly. With reference to both FIGS. 1 and 2, in some embodiments, creative development platform 200 includes an application programming interface (API) 204 that processes the data provided from/to the interface 202. As shown in FIG. 2, API 204 is between the input interface 202 and various creative platform components of platform 200 (e.g., servers and functions those servers perform) that in conjunction are used to generate a creative containing media objects such as images, an audio segments, and/or video clips, automatically.

The parameters of the input data are processed by the corresponding creative platform components of creative development platform 200. Different kinds of targeted requests, for example, have respective flows. In addition, these different sequential steps are performed on the input data. Such creative platform components perform: mixing, transcoding, sending emails, and the like. Together the creative platform components of creative development platform 200 generate a creative in the form of a targeted media content item.

Example aspects provide a definition of the workflow and workers that perform the various steps within the workflow. Workflows are processed by workers which are programs that interact with processors that coordinate work across components of the creative development platform 200 to get tasks, process them, and return their results. A worker implements an application processing step. In some embodiments, the workflows executed by the workers provide recovery mechanisms, retry mechanisms, and notification mechanisms.

Each function described above in connection with FIG. 2 is automated. Automation is used, for example, to create the parameters that are incorporated in the creative, to generate audio, and to control trafficking.

Each of the steps of a workflow is performed by the various functions is performed asynchronously. As such, one function flow is not waiting for the result of another function flow. Once a series of steps are initiated those steps are performed in the background by the workers. A view of the output (i.e., a view of a media object) is returned via an interface. Optionally a view of the output is returned via an interface at each step. If necessary, a notification is issued (e.g., via an interface) requesting additional input. The individual workflows are performed asynchronously. A responses initiated within each flow (e.g., a notification or request for additional information) that are communicated through, for example, the interface, are synchronous.

The example embodiments execute a number of workflows depending on the input they receive. For example various types of input can be received through the interface. Depending on the type of input, a different workflow is performed. For example, if a media content item or location of a media content item (e.g., a background track) is input, one workflow is performed. If no such input is received, then another workflow is performed, for example, which either requests or otherwise obtains a different type of input.

In an example embodiment, logic determines, based on some combination of inputs, a particular flow that should be implemented. Each flow returns a result (e.g., a return value such as a Boolean value). If each step is successful (as defined by a predetermined measure of success), the worker returns a success message, and the manager for the entire flow or pipeline knows to step the media object (e.g., an audio advertisement to be transmitted) to its next successful state based on the workflow definition. If a failure during the flow occurs, the individual workflow can handle the failure mode itself. In some embodiments, the workflow may not be capable of resolving the failure mode but, according to a corresponding workflow definition may be arranged to retry a sequence of steps. In other words, the workflow, workflow definition and type of error dictate the response and output. For example, if the cause of the failure mode is the workflow itself, the workflow definition may have a solution to the failure that caused the failure mode. In some embodiments, a first workflow may be expecting data from another component of the system and not receive it in a timely manner. In one non-limiting example, the first workflow can continue moving forward through its steps without waiting for the data to be prepared e.g., by a second workflow because the data needed by the first workflow is still being prepared by the second workflow and may take additional time to prepare.

In an example embodiment, each independent routine, e.g., waiting for a voiceover, generating a new voiceover project, mixing, and trafficking are workers in the pipeline manager. Every worker has a defined logic that it performs. A mixing worker, for example, calls scripts that perform certain functionality. If the mixing worker performs the scripts successfully, the mixing worker causes a mixed media object (e.g., audio advertisement) to be stored in memory so that it can, in turn, be accessed for other steps and returns a message indicating that it executed its flow successfully. If for example, the mixing worker performs a script that fails, then the mixing worker returns a message or value indicating that it has failed.

Every worker also has its own definition for what is successful. In the case of a mixing worker, for example, if an internal process in the mixing stage has determined that an internal stage has failed (e.g., a voiceover is silent indicating that the voiceover mixing has failed), then the mixing worker returns a message indicating that the mixing stage has failed. Every worker has its own definition of what is successful and what is a failure.

Example embodiments described herein can also provide automated routing and failure (e.g., retries) and recovery handling (e.g., fallback). In addition, the embodiments allow the various functions to be modular and for different workflows to be defined. If one worker fails, the logic for how it would fallback is dependent on the type failure. Each worker can thus be performed more than one time safely.

In an exemplary embodiment, the individual creative platform components may not be part of a sequential workflow. In other words, they do not know that they are going to flow at all, they just know that they might being called. This allows the manager to be untethered to any particular workflow.

Pipeline manager is given all of the workers and workflow definitions. The pipeline manager, using the workflow definitions executes the workers in sequence and manages predefined successes and failures.

Figure 3:
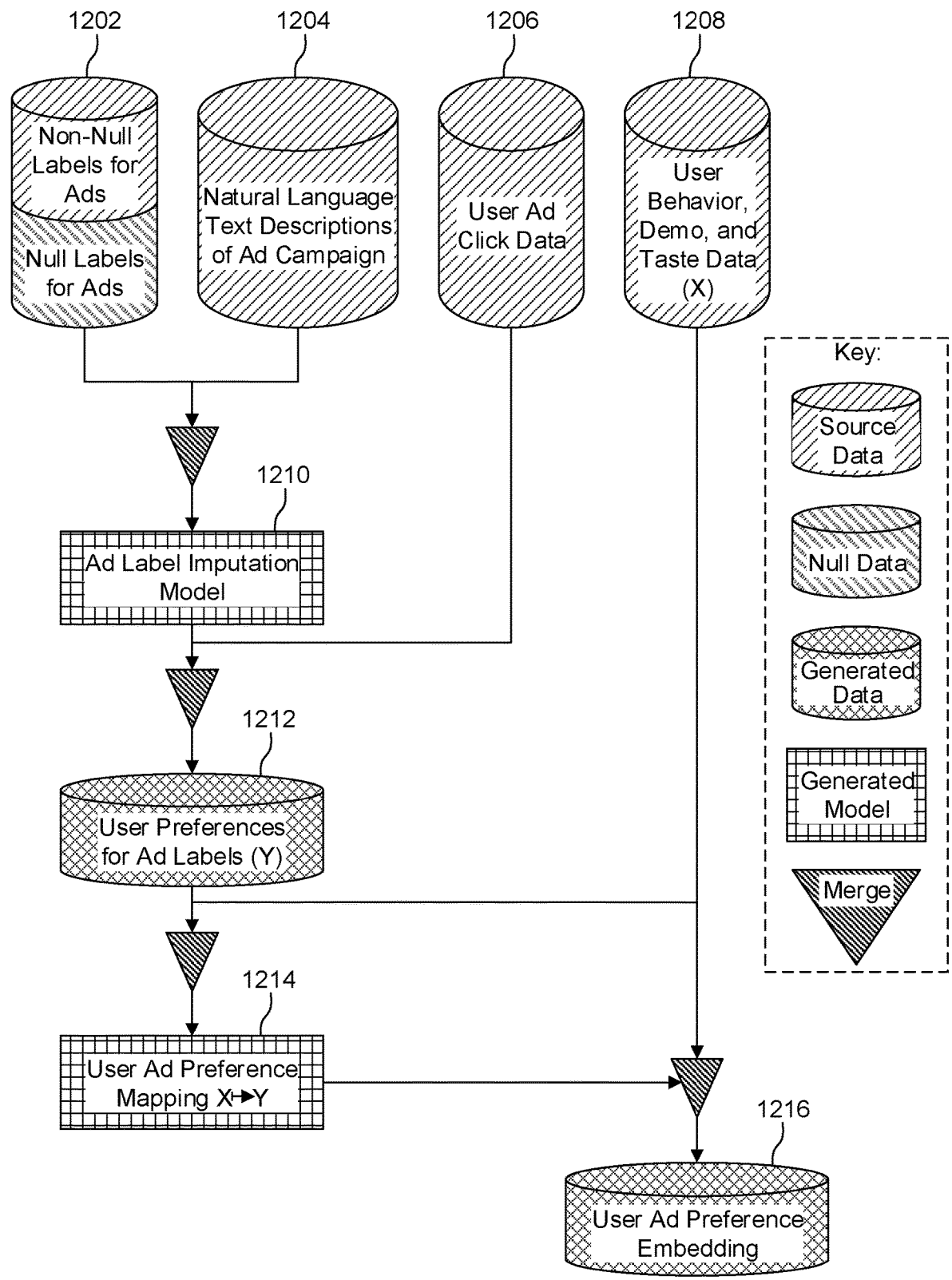
FIG. 3 is an example system for creating an embedding of the profile of a user into a latent space.

FIG. 3 is an example system for creating an embedding of a profile of a user into a latent space in accordance with some embodiments. An embedding, sometimes referred to as a neural network embedding, is a mapping of a discrete, categorical, variable to a vector of continuous numbers that is used to represent discrete variables as continuous vectors. In some embodiments, embeddings are low-dimensional, learned continuous vector representations of discrete variables that can be used to reduce the dimensionality of categorical variables and meaningfully represent the categories in a transformed space. Advantageously, the embedding makes any subsequent use of the system more computationally tractable. In some embodiments, the system allows a space of points that represent some attributes of users to be used to learn a function that maps this space (i.e., the space of points that represent some attributes of users) into a space of advertisement (ad) preferences. The mapping that results is then applied to all users of the platform. The results of the mapping applied to all users of the platform provides the ability to model preferences for the entire user-base, where the embeddings provide a dense space representation of the entire user-base.

In one example embodiment, a model is trained on a subset of users who actually interact with an advertisement, thus providing a functional form that takes points in the dense space and maps them to points in the space of advertising preference. Specifically, the dataset that is used arises from a user-music taste model along with behavioral data that arises from specific interactions with clients, and some demographic information. The outcome of this model is an embedding of users in the space of ad preferences that can be used for a number of things, including but not limited to:

Ad recommendations
Campaign extensions via user similarity
Automated audience segmentation
Campaign optimization By using a transformation very specific attributes of users (i.e. the likelihood of a user to click on ads) can be inferred from very general attributes (i.e. demographic information, music taste, etc.). This sidesteps the biggest issues associated with the cold start problem by getting a rough embedding early on, and allowing the embedding to get better over time.

Referring still to FIG. 3, in one example embodiment, a model is built in several stages. Initially, ads and campaigns are stored in an ad campaign database 1204. In some example embodiments, ad campaign database 1204 is configured to store natural language text descriptions of ad campaigns.

Labels are stored in label database 1202. In some embodiments, labels only for a subset of campaigns are stored in label database 1202.

The ads and campaigns are, in turn, categorized. In an example embodiment, a model 1210 (referred to as ad label imputation model 1210) is trained. In some examples, ad label imputation model 1210 imputes labels for the remaining ads.

Click data is the aggregation of tracked behavior of a user across a webpage, website, service or application. In some embodiments, the tracked behavior includes information such as user identifier (ID), timestamp, source, conversion, revenue, and previous URL. Click data is stored in a user ad click data store 1206. The labels from label database 1202 are merged with the user click data stored in user ad click data store 1206, the merge resulting in a collection of all users who have clicked on ads and the respective preferred labels of those users. A database configured to store user preferences for ad labels 1212 stores the collection of all users who have clicked on ads and their respective preferred labels. The database configured to store user preferences for ad labels 1212 is sometimes referred to as user ad preferences database 1212.

A collection of user data (X) is stored in database 1208. In some embodiments, the collection of user data (X) stored in database 1208 includes user behavior data, user demographics data, and user taste data. The collection of user data (X) stored in database 1208 is used to learn a mapping into the space of user ad preferences (Y) stored in database 1212. The user ad preference mapping component 1214 performs the mapping of the collection of user data (X) and the space of user ad preferences (Y). In turn, this mapping is applied to all users, regardless of whether or not they have clicked on (or even seen) an advertisement. The result is a user ad preference embedding. The user ad preference embedding can be stored in a user ad preference embedding database 1216.

FIG. 4 illustrates a mapping from metadata to labels in accordance with an example embodiment.

FIG. 4 shows an example data set illustrating ad label inferences. Ad label inference data includes an order identifier ("orderID") 402 that is used to reference a particular ad campaign, a label name ("labelName") 404 corresponding to a type of ad campaign, an entity name ("companyName") 406 identifying the name of a corresponding entity for which the ad campaign(s) are for and an order name ("orderName") 408 identifying the name of an ad campaign order.

As shown in FIG. 4, label names 404 are predicted as a function of two different sets of data corresponding to attributes of an ad campaign, namely the entity name 406 and the order name 408. In other words, in the case of a null label name, that null label name is predicted as a function of the entity name 406 and the order name 408.

Figure 5A:
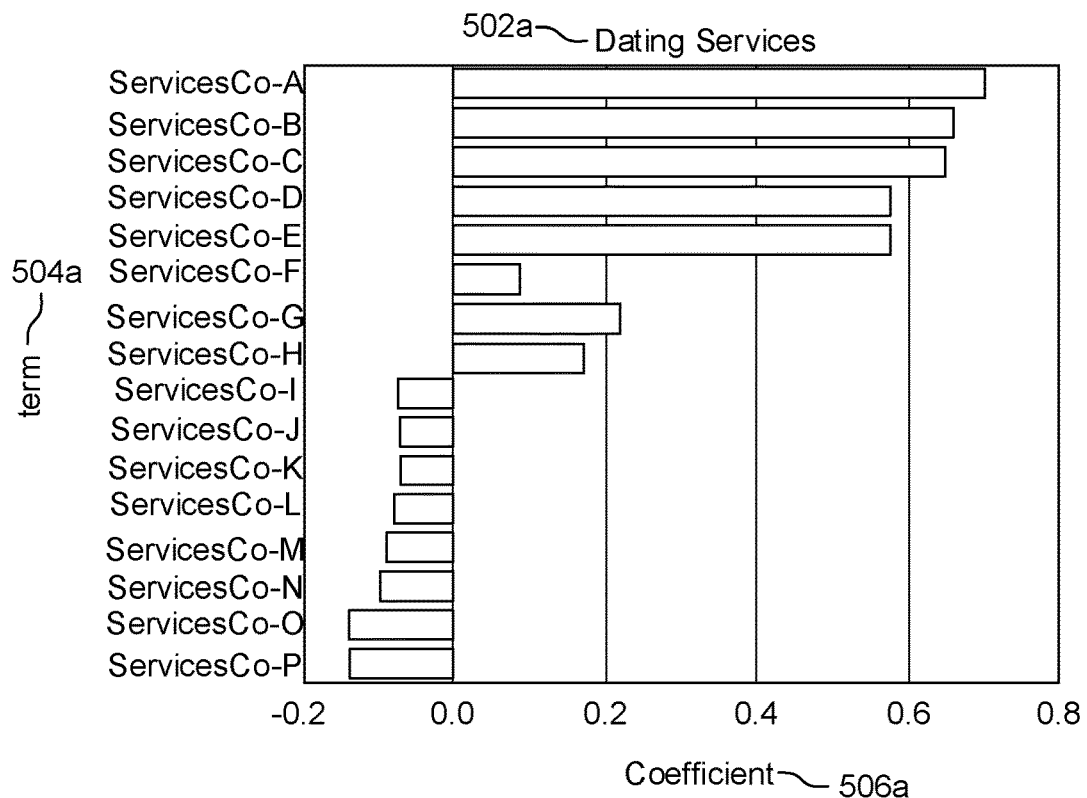
FIG. 5A illustrates an example ad label inference model according to an example aspect of the present invention.
Figure 5B:
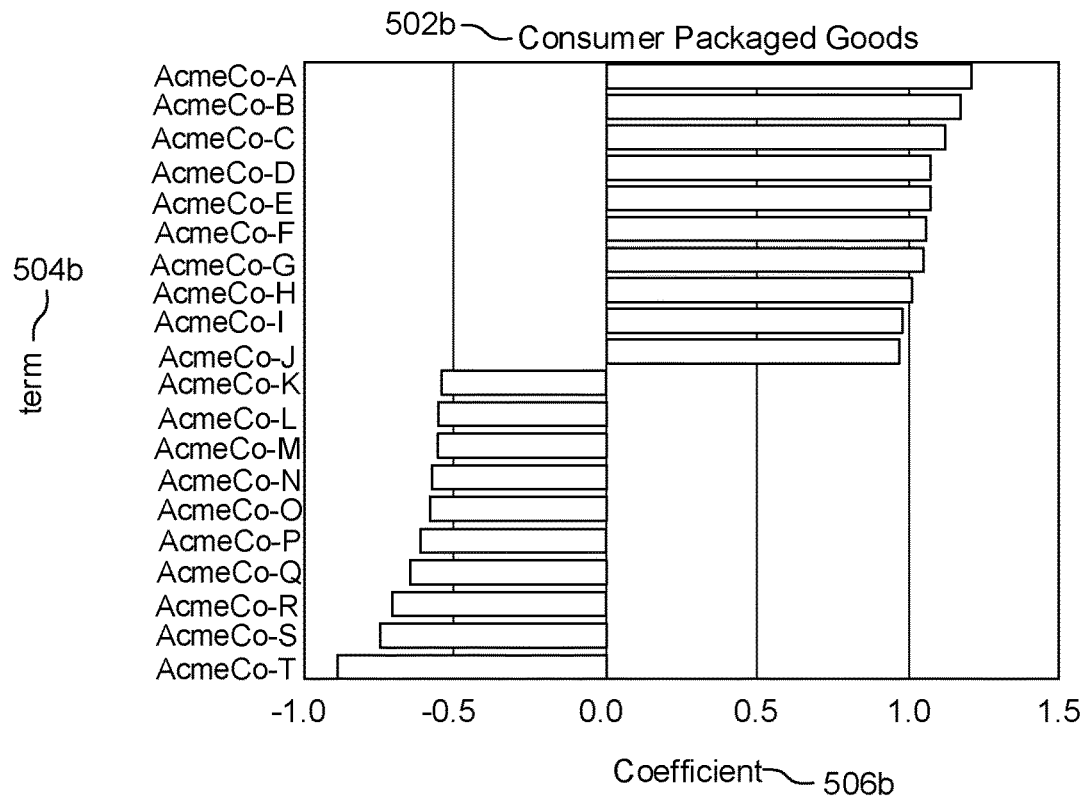
FIG. 5B illustrates an example ad label inference model according to an example aspect of the present invention.

FIGS. 5A and 5B illustrate example ad label inference models according to an example aspect of the present invention. As shown in FIG. 5A and FIG. 5B, for each ad type (502a, 502b), a model is used to infer the type of an unlabeled order. As shown in FIG. 5A, the labels 504a that are more closely related to the ad type "dating services" 502a have higher coefficients 506a. Similarly, as shown in FIG. 5B, the labels 504b more closely related to ad type "consumer packaged goods" 502b have are associated with higher coefficients 504b. In some embodiments, the model is a sparse multi-class logistic regression model. The process includes collecting data containing natural language descriptions of the advertisements and labels of what the advertisement is. In turn, a machine learning processor learns a mapping from the natural language descriptions to the label.

In an example implementation, a bag-of-words model is used to provide a simplified representation of attributes regarding advertisements. Each advertisement is described by its attributes in the form of text in a document. The text of the advertisement attributes are represented as the bag (multiset) of words. Any information about the order or structure of the words in the document is discarded. The bag-of-words are then classified. The frequency of occurrence of each attribute is then used as a feature for training a classifier. A vector corresponding to each advertisement document is generated and the vector is used as input or output for a machine learning model. The vectors can be stored in vector database 124 of system 100 as shown in FIG. 1.

The following is an example of a database record (i.e., structure for user activity/demographics). In this example, a user identifier ("user_id") is a string, the age of a user associated with the user identifier is an integer, the gender associated with the user associated with the user identifier is a string, and a favorite genre associated with the user associated with the user identifier is a string.

```
{
    "user_id": string,
    "age": int,
    "gender": string,
    "favorite_genre": string,
    ...
    "collaborative_filtering_vector": array[float]
}
```

"collaborative_filtering_vector" is the output of a collaborative filtering algorithm. Generally, the collaborative filtering model analyzes the behavior of a user and compares it to the behaviors of other users. In particular the output of a collaborative filtering algorithm in an example embodiment is a vector-space representation of a user's musical tastes. In turn, this space is transformed to become a representation of ads. This is powerful in the area of media content services, particularly music streaming services because most users do not click ads, but all user's of music streaming services stream music. Consequently, the streaming behavior of such music streaming services users can be used to infer things about what ads they might like. Again, the output of the transformation is a vector-space, rather than a prediction like most ad click modeling tasks.

Ad Preference Lookalike Generation Engine

Another example aspect of the present invention is a system constructed to find users who are similar based on their inferred preferences for various types of advertisements. Generally, a model is used to find from a set of users (referred to as "seed users") a subset of the users having the most similar preferences. These similar users then get written to a table in a similar user's database.

Ad preferences are used as a source data, and therefore can bypass the step of building a separate propensity model to layer on top of profile similarity.

One example implementation is a system that finds groups of users with similar ad preferences to a query set of users. It is able to find similar users in the simplest possible way, without resorting to separate models for similarity and preference. It can be used in a number of settings, including, but not limited to:

Campaign Extension
Audience Extension
Opportunity Sizing
Exploratory Analysis

One example embodiment takes a user ad reference embedding stored in user ad preference embedding database 1216 (as described above with respect to FIG. 3), as well as a set of seed users stored in a seed user database, and returns the n most similar users to each seed user, where n is an integer. The n most similar users to each seed user is stored in a similar users database. The problem of finding similar users is posed as a nearest-neighbor search (NNS) problem. Nearest neighbor search (NNS) is a proximity search that finds a point in a given set that is closest (or most similar) to a given point.

Locality-Sensitive Hashing (LSH) is an algorithm for solving an approximate or exact NNS in high dimensional spaces. LSH is used to simplify the search-space for any query point. The point in the embedding space for each seed user is taken as a query point in the LSH model to return the n similar users. These users are then written to the similar user's database.

Given any query set of users, not just an audience, this system is able to find the set of users with similar ad preferences.

Figure 6:
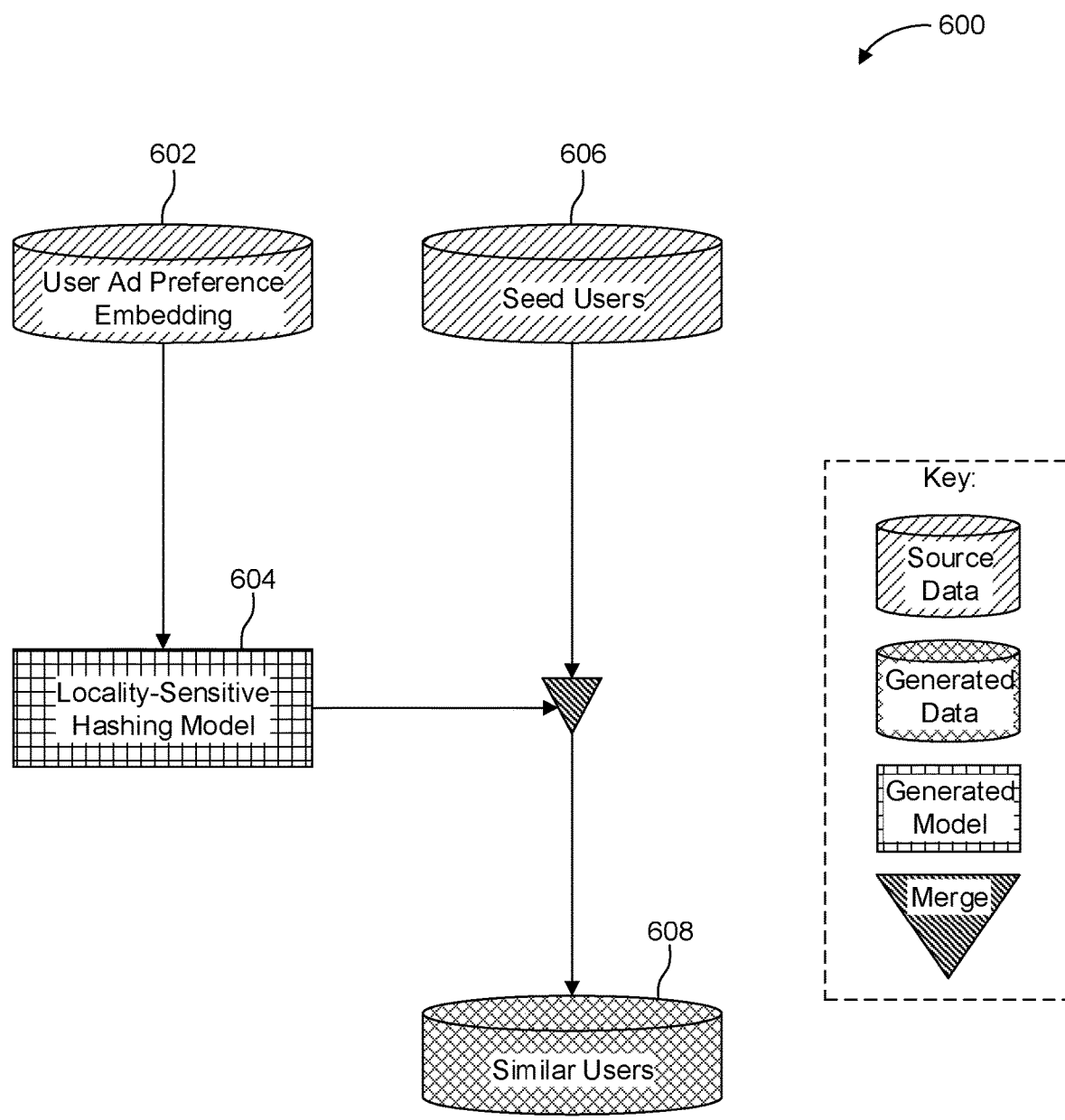
FIG. 6 illustrates an advertisement preference lookalike generation engine in accordance with an example embodiment.

FIG. 6 illustrates an advertisement preference lookalike generation engine 600 in accordance with an example embodiment. As shown in FIG. 6, user ad preference embeddings are stored in a user ad preference embedding database 602. The user ad preference embedding database 602 is communicatively coupled to a locality-sensitivity hashing (LSH) model 604. LSH model 604 hashes the user ad preference embeddings to map similar items to the same buckets with high probability (the number of buckets being much smaller than the universe of possible input items). A set of seed users stored in a seed user database 606. A point in the embedding space for each seed user stored in a seed user database 606 is, in turn, taken as a query point in the LSH model 604 to return n similar users. These n similar users are then written to a similar user database 608. In some embodiments n is an integer.

As described above, creative generator server 108 and trafficking server 110 cooperatively operate to generate and traffic creatives. Trafficking server 110 executes trafficking workflows asynchronously for the purpose of communicating the creatives generated by creative generator server 108 to targeted media-playback devices. Each creative is, in turn, communicated through network 102 to a client device 106 that has been targeted to receive the creative. The client device 106, in turn, plays the creative.

As described above with respect to FIG. 2, in some embodiments, creative platform components also can include a targeting processor 218, audience generation service 220, and a content provider database 222. Creative platform components also can include a trafficking and performance tracking processor 214 and a creative distribution server 216.

Figure 7:
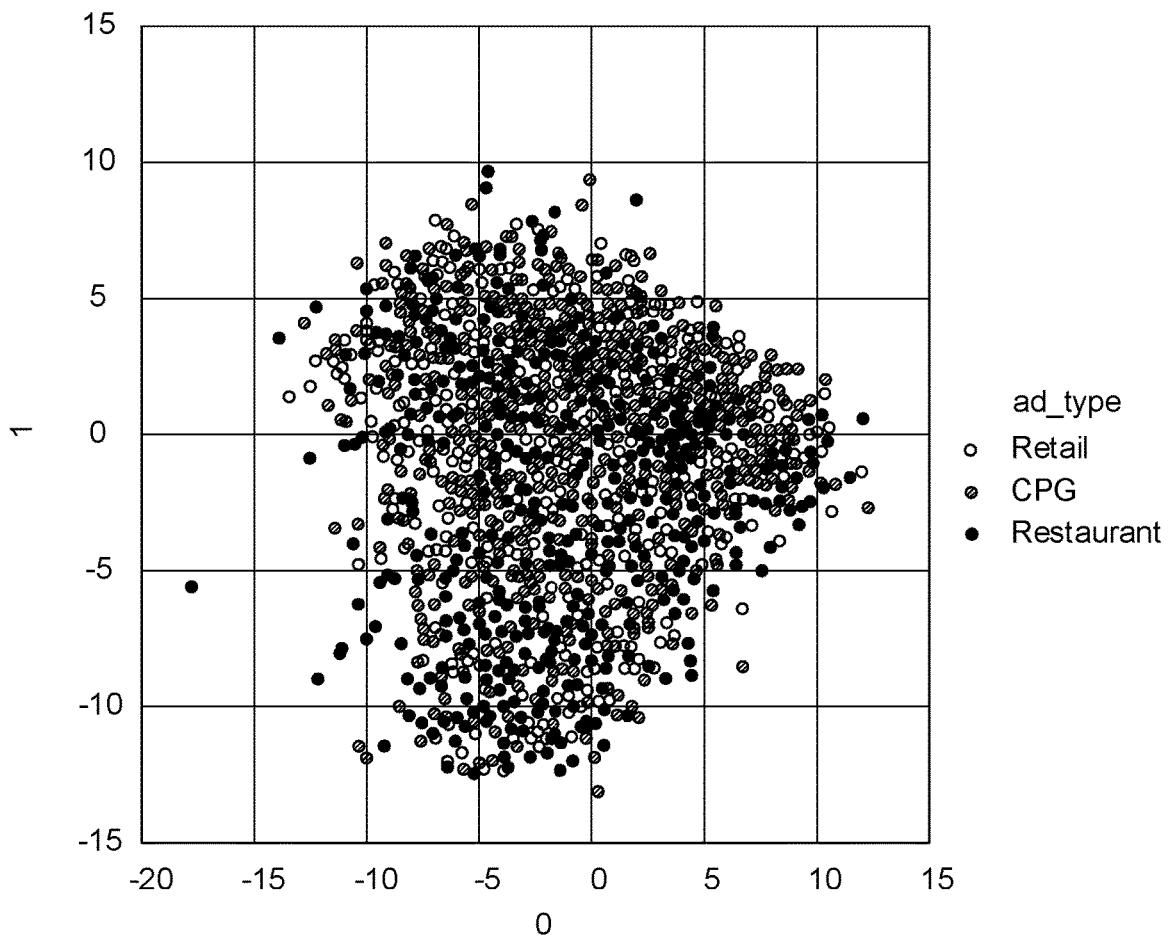
FIG. 7 illustrates a user level musical taste expressed as two principal components of a latent factor embedding in accordance with an example embodiment.

FIG. 7 illustrates a user level musical taste expressed as two principal components of a latent factor embedding in accordance with an example embodiment. In an example embodiment, the trafficking server finds, for each user, the most-clicked ad type for any given day. In turn, the most-clicked ad type for any given day is used as an outcome variable in a supervised learning problem. FIG. 7 particularly shows user-level musical taste for a particular user expressed as the first two principal components of a latent factor embedding. Specifically, the x and y axes are principal components that represent latent, uncorrelated structure in the data (i.e., as opposed to any actual variables).

The different shades of gray represent "labels" corresponding to different types of advertisements for different industries of advertisers.

Figure 8:
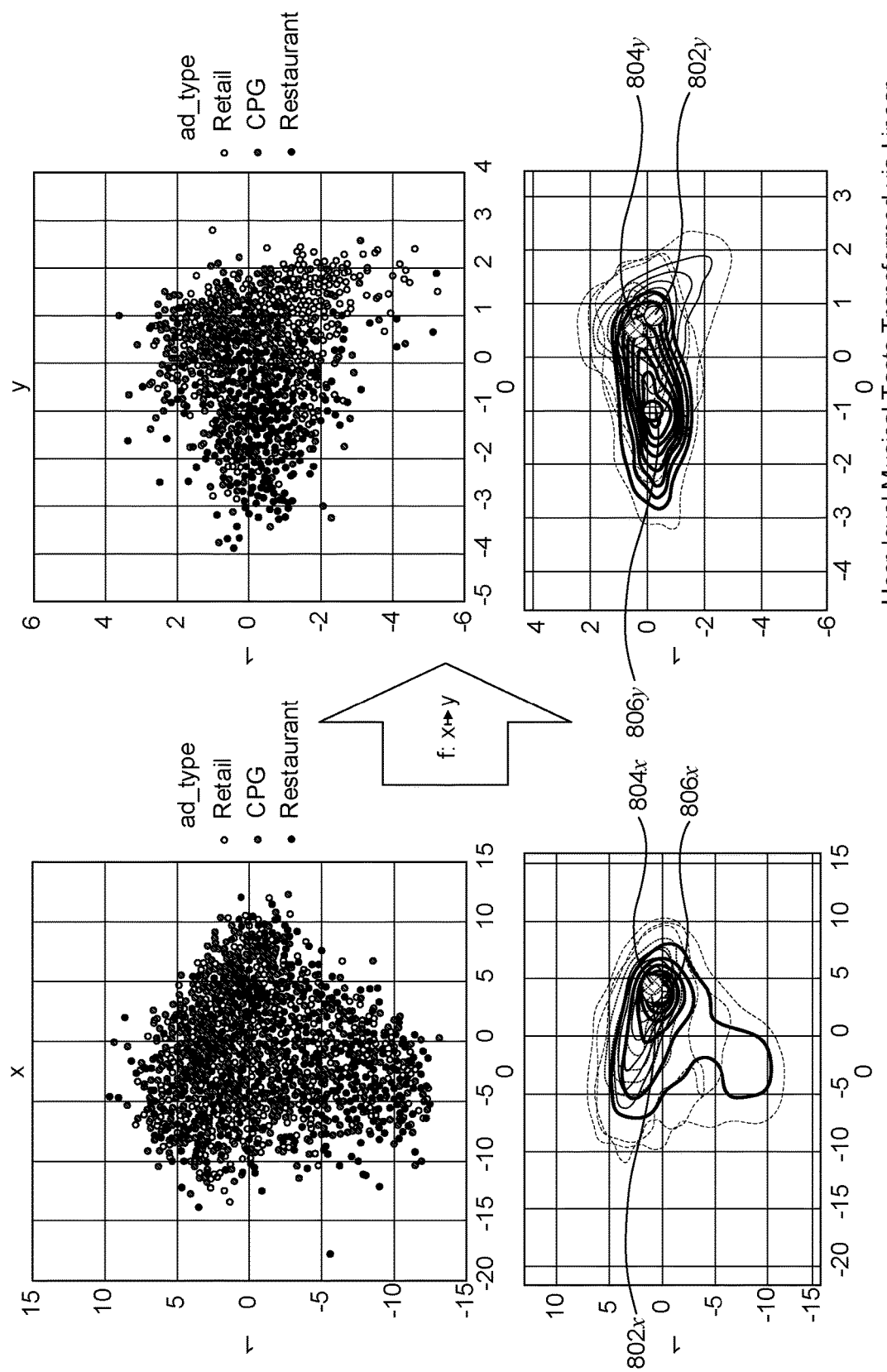
FIG. 8 illustrates the generation of a coordinate space in which to compute a quantitative definition of similar user behavior corresponding to the user level musical taste in accordance with an example embodiment.

FIG. 8 illustrates the generation of a coordinate space in which to compute a quantitative definition of similar user behavior corresponding to the user level musical taste described above with respect to FIG. 7. To obtain the coordinate space, a neural network processor learns a mapping from collaborative filtering vectors into a vector-space, where users with similar ad preferences are close together. As shown in FIG. 8, user-level musical tastes is expressed as the first two principal components of a latent factor embedding. In turn, the user-level musical taste is transformed via Linear Discriminant Analysis (LDA) into a space that maximally separates users by their ad preferences. Particularly, FIG. 8 illustrates the translation of an embedding space that describes a musical taste of a user into an embedding space that describes ad preferences of a user. The three different versions of dots are all distributed the exact same on the left side, but on the right side, the distributions have been pulled apart. In other words, the modes of distribution are spread further apart upon applying the transformation as illustrated by 802$x$→802$y$, 804$x$→804$y$, and 806$x$→806$y$. This signifies that users who like the same ads are all close together i.e., users who like retail ads are "near" (in terms of Euclidean distance) other users who retail car ads. The model is run in a forward direction by taking an inner product: $f:x→y=x●w$, where x is a matrix of user vectors and w is the transformation matrix that is obtained from the LDA. The prediction can be performed in parallel.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random access memory, for temporary data and program instruction storage. From a software standpoint, a CPU typically includes software resident on a storage media (e.g., a memory card), which, when executed, directs the CPU in performing transmission and reception functions. The CPU software may run on an operating system stored on the storage media, such as, for example, UNIX or Windows, iOS, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A computer-implemented method for automating the association of messages, comprising the steps of:
    logging into an activity database a plurality of sets of one or more activity data points, each of the plurality of sets associated with a respective one of a plurality of users, each of the plurality of users associated with at least one client device;
    retrieving, from a label database, a plurality of labels corresponding to a plurality of message records stored in a message database;
    retrieving, from a message-signal database, a plurality of message-signal values representing behavior of a subset of the plurality of users associated with at least a subset of the plurality of message records;
    merging the plurality of labels with the plurality of message-signal values to generate a signal-label collection;
    training, by machine learning, a signal-label model based on the signal-label collection, thereby generating a vector-space representation of a trained signal-label model;
    generating, using a neural network processor and the trained signal-label model, a mapping of the plurality of sets of one or more activity data points and the plurality of labels;
    associating, at least in part based on the mapping, one or more users outside the subset of the plurality of users with one or more of the plurality of message records; and
    transmitting, through one or more networks, the one or more of the plurality of message records associated with the one or more users outside the subset of the plurality of users to the at least one client device associated with one or more uses outside the subset of the plurality of users.

2. The method according to claim 1, further comprising the steps of:
    generating a collection of label-group identifiers, each label group identifier corresponding to one or more of the plurality of labels; and
    generating a ranking map that maps a ranking to each label-group identifier.

3. The method according to claim 1, wherein the one or more activity data points in each of the plurality of sets include a plurality of behavior data points corresponding to actions of the respective user and one or more demographic data points associated with one or more demographic attributes associated with the respective user.

4. The method according to claim 1, wherein each of the plurality of message-signal values represents an action associated with a plurality of sets of client devices, each set of client devices associated with a different identifier.

5. The method according to claim 1, wherein the plurality of labels corresponds to a subset of the plurality of message records.

6. The method according to claim 1, wherein the plurality of labels includes a plurality of non-null labels and a plurality of null labels and further comprising the steps of:
    training a label model based on a plurality of non-null labels, thereby generating a trained label model; and
    imputing, using the trained label model, the null labels.

7. The method of claim 6, wherein the generating the mapping of the plurality of sets of one or more activity data points and the plurality of labels comprises generating a vector-space representation of the mapping.

8. A non-transitory computer-readable medium having stored thereon one or more sequences of instructions for causing one or more processors to perform:
    logging into an activity database a plurality of sets of one or more activity data points, each of the plurality of sets associated with a respective one of a plurality of users, each of the plurality of users associated with at least one client device;
    retrieving, from a label database, a plurality of labels corresponding to a plurality of message records stored in a message database;
    retrieving, from a message-signal database, a plurality of message-signal values representing behavior of a subset of the plurality of users associated with at least a subset of the plurality of message records;
    merging the plurality of labels with the plurality of message-signal values to generate a signal-label collection;
    training, by machine learning, a signal-label model based on the signal-label collection, thereby generating a trained signal-label model;
    generating, using a neural network and the trained signal-label model, a mapping of the plurality of sets of one or more activity data points and the plurality of labels;
    associating, at least in part based on the mapping, one or more users outside the subset of the plurality of users with one or more of the plurality of message records; and
    transmitting, through one or more networks, the one or more of the plurality of message records associated with the one or more users outside the subset of the plurality of users to the at least one client device associated with one or more uses outside the subset of the plurality of users.

9. The non-transitory computer-readable medium of claim 8, further having stored thereon a sequence of instructions for causing the one or more processors to perform:
    generating a collection of label-group identifiers, each label group identifier corresponding to one or more of the plurality of labels; and
    generating a ranking map that maps a ranking to each label-group identifier.

10. The non-transitory computer-readable medium according to claim 8, wherein the one or more activity data points in each of the plurality of sets include a plurality of behavior data points corresponding to actions of the respective user and one or more demographic data points associated with one or more demographic attributes associated with the respective user.

11. The non-transitory computer-readable medium according to claim 8, wherein each of the plurality of message-signal values represents an action associated with a plurality of sets of client devices, each set of client devices associated with a different identifier.

12. The non-transitory computer-readable medium according to claim 8, wherein the plurality of labels corresponding to a subset of the plurality of message records.

13. The non-transitory computer-readable medium according to claim 8, wherein the plurality of labels includes a plurality of non-null labels and a plurality of null labels and further comprising the steps of:
    training a label model based on a plurality of non-null labels, thereby generating a trained label model; and
    imputing, using the trained label model, the null labels.

14. The method of claim 13, wherein the generating the mapping of the plurality of sets of one or more activity data points and the plurality of labels comprises generating a vector-space representation of the mapping.

* * * * *